United States Patent [19]

Steinbach et al.

[11] Patent Number: 4,643,771

[45] Date of Patent: Feb. 17, 1987

[54] PRODUCTION OF WATER-REPELLENT MOLDINGS FROM PLASTER

[75] Inventors: Hans-Horst Steinbach, Gladbach; Matthias Rieder, Odenthal, both of Fed. Rep. of Germany

[73] Assignee: Bayer Aktiengesellschaft, Leverkusen, Fed. Rep. of Germany

[21] Appl. No.: 759,034

[22] Filed: Jul. 25, 1985

[30] Foreign Application Priority Data

Aug. 9, 1984 [DE] Fed. Rep. of Germany ....... 3429311

[51] Int. Cl.$^4$ ............... C04B 11/00; C04B 24/00; B32B 31/12; B32B 5/20
[52] U.S. Cl. .................... 106/111; 106/110; 156/41; 156/43
[58] Field of Search .............. 106/109, 111, 110; 156/39, 41, 43

[56] References Cited

U.S. PATENT DOCUMENTS

| | | | |
|---|---|---|---|
| 2,985,219 | 5/1961 | Summerfield | 156/43 |
| 3,455,710 | 7/1969 | Nitzsche et al. | 106/11 |
| 3,623,895 | 11/1971 | Nitzsche et al. | 106/111 |
| 3,814,659 | 1/1974 | Wadeau | 156/43 |
| 3,936,311 | 2/1976 | Kirst et al. | 106/119 |
| 4,136,687 | 1/1979 | Dadroski | 106/111 |
| 4,153,470 | 5/1979 | Stahl et al. | 106/116 |
| 4,279,673 | 7/1981 | White et al. | 156/39 |
| 4,447,498 | 5/1984 | Fink et al. | 156/41 |
| 4,518,652 | 5/1985 | Willoughby | 156/41 |

OTHER PUBLICATIONS

W. Noll, "Chemistry and Technology of Silicones", (1968), 626/627.
R. L. Bass, "Surface Activity of Organo'Silicon Compounds", Chemistry and Industry, 7/18/59, pp. 912-918.

*Primary Examiner*—Gary P. Straub
*Attorney, Agent, or Firm*—Sprung, Horn, Kramer & Woods

[57] ABSTRACT

A water-repellent plaster molding is produced by forming a foam of water, surfactant and polyalkyl-hydrogensiloxane adding this foam to a paste of plaster powder in water, and letting the mixture set.

8 Claims, No Drawings

PRODUCTION OF WATER-REPELLENT MOLDINGS FROM PLASTER

The present invention relates to a process for the production of water-repellent moldings from plaster powder, particularly for the production of porous sandwich type plaster boards in which a polyalkylhydrogensiloxane is added to the plaster paste.

It is known to equip plaster products, for example sandwich type plaster boards which have a substantial water absorption ability, in a water-repellent manner using organosilicon compounds. The waterproofing can be undertaken after the completion of the plaster products, but is carried out in most cases by addition of suitable organosilicons ready-made to the plaster constituents. This process is also referred to as mass waterproofing.

For this mass waterproofing, aqueous emulsions based on polyalkyl-hydrogen-siloxanes are today principally used (DE-PS 1 223 287). It is also known to use polyalkyl-hydrogen-siloxanes in pure form (DE-OS 2 740 049). In the latter case, it is however impossible in practice to distribute the oil in the aqueous plaster paste, consisting of mixing water and plaster powder, owing to the water-insolubility thereof. Consequently, no water-repellent properties are obtained in spite of the addition of organosilicon compounds. In practice, the use of polyalkyl-hydrogen-siloxanes gives a substantially more economical form; so far, however, no process has existed for evenly distributing the oil in the plaster paste.

Thus the need exists for a suitable process for equipping porous sandwich type plaster boards in a water-repellent manner by mass waterproofing using polyalkylhydrogen-siloxane, which can be carried out in a simple manner without changing the course of production and which in comparison with the process known so far allows greater profitability. It was thus an aim of the present invention to provide such a process.

The object of the invention is thus a process for the production of porous sandwich type plaster boards, which is characterized in that from 0.1 to 0.5 parts by weight of polyalkyl-hydrogen-siloxane, based on 100 parts by weight of plaster powder, are added to the products, surfactant and water, situated in the form generator.

There are used as foaming surfactants known compounds, in particular the class of substances comprising alkylaryl sulphates or alkylaryl sulphonates, for example sodium salts of alkylbenzenesulphonates, lauryl sulphate or alkylpolyglycolethersulphate, which contribute to pore formation through their strong foaming properties.

The surfactant concentration in the foam generator is from about 0.1 to 0.5 parts by weight, based on 100 parts by weight of plaster powder.

It has surprisingly been seen that the extremely low surfactant concentration in the foam generator is sufficient to emulsify polyalkyl-hydrogen-siloxane in water and to give this emulsion a sufficient stability, necessary in order to evenly distribute the emulsified silicone oil in the plaster paste. Foam volume and pore size of the foam are not disadvantageously influenced by addition of polyalkyl-hydrogen-siloxane in the foam generator. This is all the more surprising since it is known that silicone oils have the effect of an antifoaming agents and destroy the foam.

Known apparatuses are suitable as foam generators, for example generators, high-speed stirrers, etc. which allows foams to be produced in a simple manner.

The plaster moldings produced according to the process of the invention, principally porous sandwich type plaster boards, have excellent water-repellent properties.

Suitable agents for the process according to the invention are polyalkyl-hydrogen-siloxanes, preferably polymethyl-hydrogen-siloxanes with a viscosity of from 10 to 50 cP/25° C.

The water-repellent effect of the porous sandwich type plaster boards produced according to the process of the invention takes effect immediately after the plaster has hardened. Disadvantageous properties regarding bending strength, resistance to pressure and weight of the boards are not observed.

The object of the present invention will now be explained in more detail by means of the following examples. The term "parts" in the following examples refers to parts by weight.

EXAMPLE 1

150 Parts of water, 1 part of ether sulphate ("Zeliquid LP 2") and 1.5 parts of a polymethylhydrogen-siloxane with a viscosity of 15 cP/25° C. are mixed together in a foam generator at 1200 RPM. The surfactant-siliconefoam obtained in the described manner is added to 700 parts of an aqueous plaster paste, consisting of 200 parts of water and 500 parts of plaster powder, which contains 94.5% of calcium sulphate, 5% of impurities and 0.5% of retarding and thickening agents. The mixing time is 5 sec at 400 RPM. The mixture obtained in this manner is poured into a metal dish. After a period of 48 h, the water absorption is determined in an immersion test. The obtained porous plaster disc is then placed in a water bath for 2 h. After this 2-hour hydration, the plaster disc shows a water absorption of 6% by weight.

EXAMPLE 2

(comparison)

If the polymethyl-hydrogen-siloxane in Example 1 is replaced by water and the procedure is as described in Example 1, then products are obtained which have an increase in weight of 39% by weight after hydration.

EXAMPLE 3

(comparison)

If the quantity of polymethyl-hydrogen-siloxane described in Example 1 is directly added to the aqueous plaster paste and the procedure is as described in Example 1, then products are obtained which have an increase in weight of 39% by weight after hydration.

EXAMPLE 4

(comparison)

If the addition of polymethyl-hydrogen-siloxane in Example 1 is increased to 5 parts, this quantity of oil is directly added to the aqueous plaster paste and the procedure is as described in Example 1, then products are obtained which have an increase in weight of 37% by weight after hydration.

EXAMPLE 5

If the quantity of polymethyl-hydrogen-siloxane added in Example 1 is decreased to 1 part and the procedure is as described in Example 1, then products are obtained which have an increase in weight of 9% by weight after hydration.

It will be understood that the specification and examples are illustrative but not limitative of the present invention and that other emobodiments within the spirit and scope of the invention will suggest themselves to those skilled in the art.

We claim:

1. A process for the production of a water-repellent porous plaster molding consisting essentially of producing a foam from water, an organosulphonate or organosulphate foaming agent and polymethyl-hydrogen-siloxane, adding this foam to a paste of plaster powder in water, and letting the mixture set, the surfactant and siloxane each being present in 0.1 to 0.5 part by weight per 100 parts by weight of the plaster.

2. A process according to claim 1, wherein the polymethyl-hydrogen-siloxane has a viscosity from 10 to 50 cP/25° C.

3. A process according to claim 1, wherein the plaster powder paste further contains a set-retarding agent.

4. A process according to claim 1, wherein the plaster powder paste further contains a thickening agent.

5. In the production of a porous plaster molding by mixing a foam made from water and a foaming surfactant to a paste of plaster powder in water and molding the resultant mixture, the improvement which comprises forming the foam of a mixture consisting essentially of water, the surfactant and polyalkyl-hydrogen-siloxane, the siloxane being added as an oil in a separate stream to the foam forming step.

6. A process according to claim 5, wherein the polyalkyl-hydrogen-siloxane is polymethyl-hydrogen-siloxane having a viscosity from 10 to 50 cP/25° C.

7. A process according to claim 15, wherein the plaster powder phase further contains a set-retarding agent.

8. A process according to claim 5, wherein the plaster powder paste further contains a thickening agent.

* * * * *

UNITED STATES PATENT AND TRADEMARK OFFICE
CERTIFICATE OF CORRECTION

PATENT NO. : 4,643,771

DATED : February 17, 1987

INVENTOR(S) : Hans-Horst Steinbach, et al

It is certified that error appears in the above-identified patent and that said Letters Patent is hereby corrected as shown below:

| | |
|---|---|
| Title Page, No."75 Inventors", line 1 | Delete "Gladbach" and substitute --Bergisch-Gladbach-- |
| Title Page, under "U.S. Patent Documents, line 4 | Delete "1/1974 Wadeau" and substitute --6/1974 Nadeau-- |
| line 6 | Delete "Dadroski" and substitute --Dabroski-- |
| Col. 1, line 46 | Delete "form" and substitute --foam-- |
| Col. 1, line 67 | Delete "an" |
| Col. 2, line 24 | Delete "Parts" and substitute --parts-- |
| Col. 4, line 16 | Delete "claim 15" and substitute --claim 5-- |

Signed and Sealed this

Fifteenth Day of September, 1987

Attest:

DONALD J. QUIGG

Attesting Officer    Commissioner of Patents and Trademarks